United States Patent [19]
Loechel

[11] Patent Number: 5,895,488
[45] Date of Patent: Apr. 20, 1999

[54] CACHE FLUSHING METHODS AND APPARATUS

[75] Inventor: Barbara Loechel, Toms River, N.J.

[73] Assignee: ECCS, Inc., Tinton Falls, N.J.

[21] Appl. No.: 08/805,086

[22] Filed: Feb. 24, 1997

[51] Int. Cl.[6] .................................................. G06F 12/00
[52] U.S. Cl. ........................ 711/135; 711/143; 711/146
[58] Field of Search ................................. 711/135, 143, 711/146, 118, 136, 113, 133, 141

[56] References Cited

U.S. PATENT DOCUMENTS

| | | | |
|---|---|---|---|
| 4,426,682 | 1/1984 | Riffe et al. | 711/135 |
| 4,775,955 | 10/1988 | Liu . | |
| 4,827,401 | 5/1989 | Hrustich et al. | 395/551 |
| 5,038,278 | 8/1991 | Steely, Jr. et al. . | |
| 5,347,634 | 9/1994 | Herrell et al. | 345/511 |
| 5,408,644 | 4/1995 | Schneider et al. | 395/180 |
| 5,414,827 | 5/1995 | Lin | 711/135 |

*Primary Examiner*—Tod R. Swann
*Assistant Examiner*—Mehdi Namazi
*Attorney, Agent, or Firm*—Michaelson & Wallace; Peter L. Michaelson; John C. Pokotylo

[57] ABSTRACT

Methods and apparatus for managing a cache which includes a number of dirty lines in which (a) the percentage of dirty lines in the cache is determined, (b) the cache is flushed if the determined percentage of dirty lines exceeds a predetermined threshold, (c) whether a state of a system is idle is determined based on at least two indicators including (i) CPU idle percentage, (ii) data bus busyness percentage, (iii) percentage of dirty lines, and (iv) I/Os per second, and (d) if the state of the system is determined to be idle, a line of the cache is flushed.

19 Claims, 6 Drawing Sheets

CACHE FLUSHING METHODS AND APPARATUS

BACKGROUND OF THE INVENTION a. Field of the Invention

The present invention concerns the management of computer memory systems, and in particular, systems with cache memory.

b. Related Art

§1. CACHE BACKGROUND

A cache memory device is a small, fast memory which should contain the most frequently accessed data (or "words") from a larger, slower memory.

Disk drive based memory affords large amounts of storage capacity at a relatively low cost. Unfortunately, access to disk drive memory is slow relative to the processing speed of modern microprocessors. A cost effective, prior art solution to this problem provides a cache memory between the processor and the disk memory system. To reiterate, the storage capacity of the cache memory is relatively small, but can be used to provide high speed access to the data.

The operating principle of the disk cache memory is the same as that of a central processing unit (or CPU) cache. More specifically, the first time an instruction or data location is addressed, it must be accessed from the lower speed disk memory. Subsequent accesses to the same instruction or data are done via the faster cache memory, thereby minimizing access time and enhancing overall system performance. However, since the storage capacity of the cache is limited, and typically is much smaller than the storage capacity of the disk storage, the cache often is filled and some of its contents must be changed (e.g., with a replacement algorithm) as new instructions or data are accessed from the disk storage.

The cache is managed, in various ways, such that it stores the instruction or data most likely to be needed at a given time. When the cache is accessed and contains the requested data, a cache "hit" occurs. Otherwise, if the cache does not contain the requested data, a cache "miss" occurs. Thus, the cache contents are typically managed in an attempt to maximize the cache hit-to-miss ratio.

FIG. 1 illustrates a high level block diagram of a conventional disk array controller 104 arranged between a host computer 102 and a disk storage array 106. The host computer 102 may include a processor 114, a memory 116, and an input/output interface 118 sharing a bus 112. The memory 116 may include a program storage section for storing program instructions for execution by the processor 114. The input/output interface 118 may use a standard communications protocol, such as the Small Computer System Interface (or "SCSI") protocol for example, to facilitate communication with peripheral devices. The disk array 106 may include an array of magnetic or optical disks 132 for example.

The disk array controller 104 includes an I/O management controller 124, a cache 126, and input/output interface(s) 128, which share a bus 122. The I/O management controller 124, which may be an application specific integrated circuit (or "ASIC") or a processor executing stored instructions for example, controls reading from and writing to the cache 126 and the disk array 106. The input/output interface(s) 128 may use the SCSI protocol to facilitate communication between it, the host computer 102, and the disk array 106.

The conventional system of FIG. 1 operates as follows. If the processor 114 of the host computer 102 issues a read command to the disk array controller 106 and if the information requested is in the cache 126, the I/O management controller 124 forwards the requested information to the processor 114 and a disk access is not necessary. To reiterate, this is known as a "cache hit". If, on the other hand, the information requested is not in the cache 126, the I/O management controller 124 retrieves the requested information from the disk array 106 and forwards it to both the cache 126 and the processor 114. To reiterate, this is known as a "cache miss".

§1.1 The Purpose of Cache Flushing and Replacement Algorithms

A cache, in its entirety, may be flushed (a) periodically, or (b) when certain predefined conditions are met. Further, individual cache lines may be flushed as part of a replacement algorithm. In each case, dirty data (i.e., data not yet written to persistent memory) in the cache to be flushed or in the cache line to be flushed is written to persistent memory. Dirty bits, which identify blocks of a cache line containing dirty data, are then cleared. The flushed cache or flushed cache lines can then store new blocks of data.

FIG. 4 is a flow diagram of a cache flush process 400. As shown in steps 402 and 404, if a cache flush is scheduled or if predetermined conditions for a cache flush are met, the cache is flushed. That is, all dirty data in the cache is written to the persistent memory. The entire cache is now available to store new blocks of data. In some known cache flushing methods, discussed below, the cache is flushed just before system shutdown.

Further, as shown in steps 406 and 408, if the cache is full when a cache line is requested, a cache line is selected (e.g., based on a replacement algorithm) and the selected cache line is flushed. The flushed cache line is now available to store new blocks of data.

§1.2 Known Cache Flushing Techniques

§1.2.1 Replacement Algorithm and Full Flush at Shutdown and its Problems

Known systems use a replacement algorithm to flush cache line(s) when a cache line is needed. Such systems may further perform a full cache flush just before system shutdown. Such systems are inefficient and expose write-back data (i.e., data written to cache to be written to persistent memory at a later time—thus, write-back data is dirty data) to loss. More specifically, with respect to the inefficiency of such systems, if a dirty cache line must be replaced to permit an I/O request to be processed, the I/O request must wait for the dirty data to be written to persistent memory before it can continue. This inefficiency caused by placing the bulk of the cache flushing burden on the replacement algorithm can become acute in instances where most of the I/O requests are random writes (i.e., writes to non-sequential storage locations). With respect to the potential loss of data, if write-back data kept in the cache (i.e., dirty data) is not flushed until the system shutdown or until the replacement algorithm determines it is the cache line to be replaced, it is kept in the cache for a prolonged time period, during which it is subject to loss, before it is written to persistent memory.

§1.2.2 Flush upon CPU Idle and its Problems

Other known systems flush the cache when a central processing unit (or "CPU") idle condition is detected, in addition to flushing subject to a replacement algorithm and/or subject to system shutdown as discussed above. While dirty data in these systems is less likely to be lost, using CPU idle as the only factor for determining when to flush a cache also has disadvantages. First, it is possible for the data bus to be overloaded when the CPU is idle. This circumstance is especially a concern in systems employing one or more direct memory access (or "DMA") units because DMA units exchange data with memory exclusive of the CPU. Flushing the cache during a DMA would disadvantageously further burden an already crowded data bus. In addition, although the frequency of flushing cache lines by a replacement algorithm is reduced as compared with the systems in which cache lines are flushed only by the replacement algorithm, the burden of cache line flushing on the replacement algorithm is still relatively high.

In view of the above drawbacks of known cache flushing methods, an improved flushing method is needed. The improved flushing method should minimize the frequency of cache line flushes initiated by a replacement algorithm so that I/O requests do not have to wait for data in the cache to be written to mass storage.

SUMMARY OF THE INVENTION

The present invention increases system performance by decreasing the burden of flushing cache lines on the replacement algorithm and by determining a better time to flush the cache. The present invention does so by providing a method for managing a cache which includes a number of dirty lines by (a) determining the percentage of dirty lines in the cache, and (b) flushing the cache if the determined percentage of dirty lines exceeds a predetermined threshold. The predetermined threshold is preferably 95 percent.

The step of determining the percentage of dirty lines in the cache may include sub-steps of (i) determining a number of dirty cache lines based on cache lines having headers with a dirty map indicating dirty data, (ii) dividing the number of dirty cache lines, determined above, by the total number of cache lines of the cache to derive a intermediate result, and (iii) multiplying the intermediate result by 100.

The present invention also provides a method for managing a cache which includes a number of dirty lines by (a) determining whether a state of a system is idle based on at least two indicators including (i) CPU idle percentage, (ii) data bus busyness percentage, (iii) percentage of dirty lines, and (iv) I/Os per second, and (b) flushing a dirty cache line of the cache if the state of the system is determined to be idle.

The present invention also provides a method for managing a cache which includes a number of dirty lines, which method combines the above two methods by (a) determining the percentage of dirty lines in the cache, (b) flushing the cache if the determined percentage of dirty lines exceeds a predetermined threshold, (c) determining whether a state of a system is idle based on at least two indicators including (i) CPU idle percentage, (ii) data bus busyness percentage, (iii) percentage of dirty lines, and (iv) I/Os per second, and (d) flushing a line of the cache if the state of the system is determined to be idle.

The state of the system may be determined to be idle when (i) the CPU idle percentage is above a first predetermined threshold (e.g., 50 percent), and/or (ii) the data bus busyness percentage is below a second threshold (e.g., 50 percent).

The data bus busyness percentage may be determined by dividing the number of blocks transferred over a data bus during a sampling period divided by the theoretical maximum number of blocks transferable over the data bus during the sampling period. The data bus may be a SCSI bus.

In a system having a host computer and a mass storage device, the present invention provides a mass storage controller having an input/output interface, a cache, and an input/output management controller. The input/output interface permits communication between the host computer, the mass storage controller, and the mass storage device. The cache has a number of cache lines, some of which may include dirty data. Finally, the input/output management controller includes (i) means for determining a percentage of dirty cache lines in the cache, and (ii) means, responsive to the determined percentage of dirty cache lines, for flushing the cache if the determined percentage of dirty lines exceeds a predetermined threshold.

The input/output management controller may also (or alternatively) include (a) means for determining whether a state of a system is idle based on at least two indicators including (i) a host CPU idle percentage, (ii) data bus busyness percentage, (iii) percentage of dirty lines, and (iv) I/Os per second, and (b) means for flushing a line of the cache if the state of the system is determined to be idle.

DETAILED DESCRIPTION

The present invention concerns novel memory management methods and apparatus. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiment shown.

§2.0 Pupose/Function of Device

One purpose of the improved flushing method and apparatus of the present invention is to minimize the frequency of cache line flushes initiated by a replacement algorithm so that I/O requests do not have to wait for dirty data in the cache to be written to mass storage. Another purpose of the improved flushing method and apparatus of the present invention is to minimize the possibility of data loss. Still another purpose of the improved flushing method and apparatus of the present invention is to perform cache line flushes at an optimal time.

In methods and apparatus of the present invention, the cache is flushed when the amount of dirty cache lines exceeds a predetermined threshold. Such a cache flush may be referred to as a "panic flush". Further, in methods and apparatus of the present invention, one flush line at a time (e.g., as determined by a replacement algorithm) is flushed based on at least two of the following: (i) the amount of dirty lines; (ii) the CPU percent idle; (iii) I/Os per second; and (iv) the state (i.e., busyness) of the data bus (e.g., percent of total SCSI capacity used). Such cache line flushes may be referred to as "controlled flushes"

§2.1 Structure of Device

Figure 1:
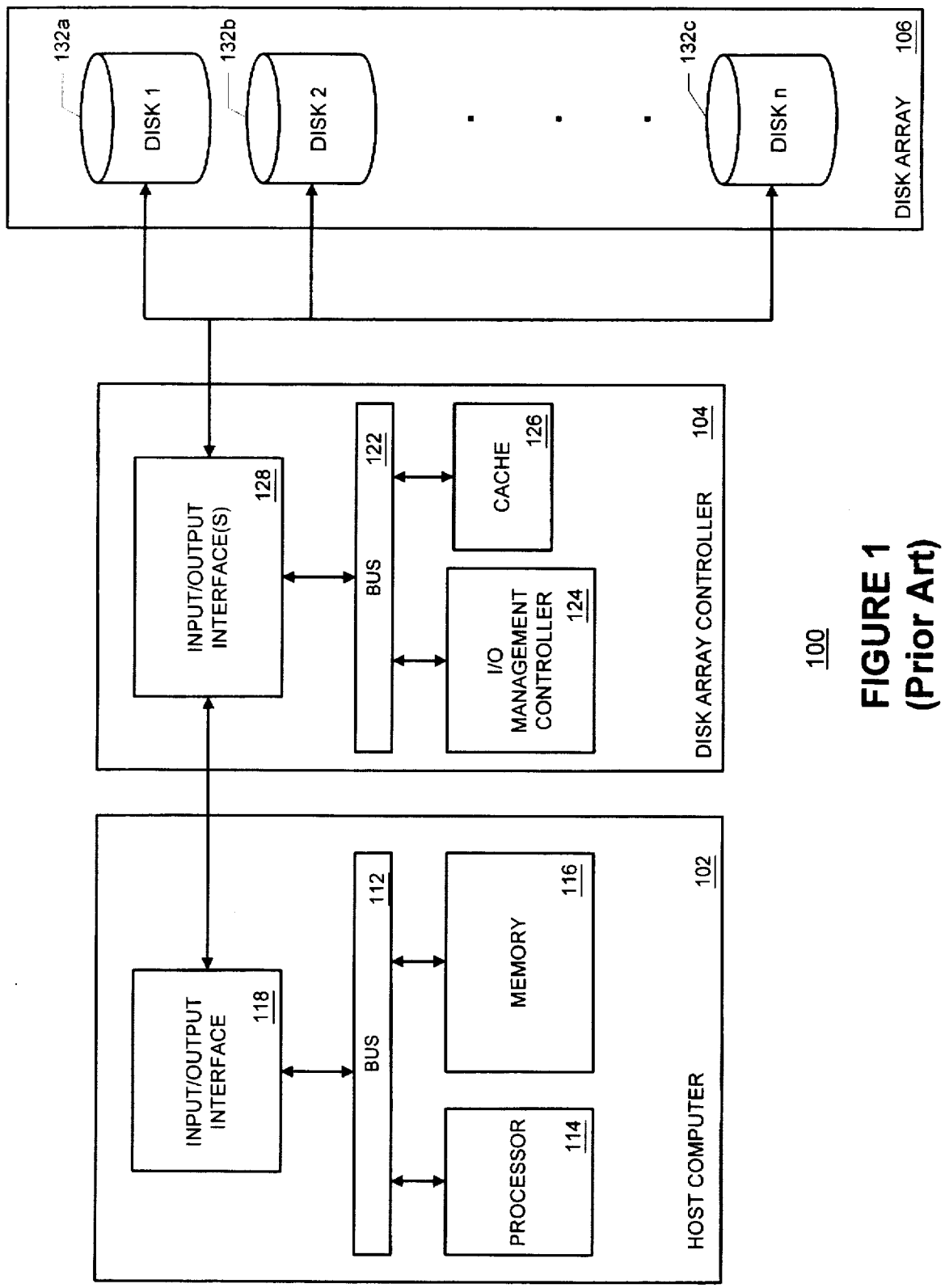
FIG. 1 is a high level block diagram of a system in which the methods and apparatus of the present invention may be used.

The method of the present invention may be implemented in the system 100 of FIG. 1 by appropriately configuring the I/O management controller 124. More specifically, the I/O management controller 124 may include a processor (not shown) and a program storage device (not shown). Thus, the method of the present invention may be effected by providing an appropriate program in the program storage device of the I/O management controller 124 for execution by the processor of the I/O management controller 124.

Figure 2:
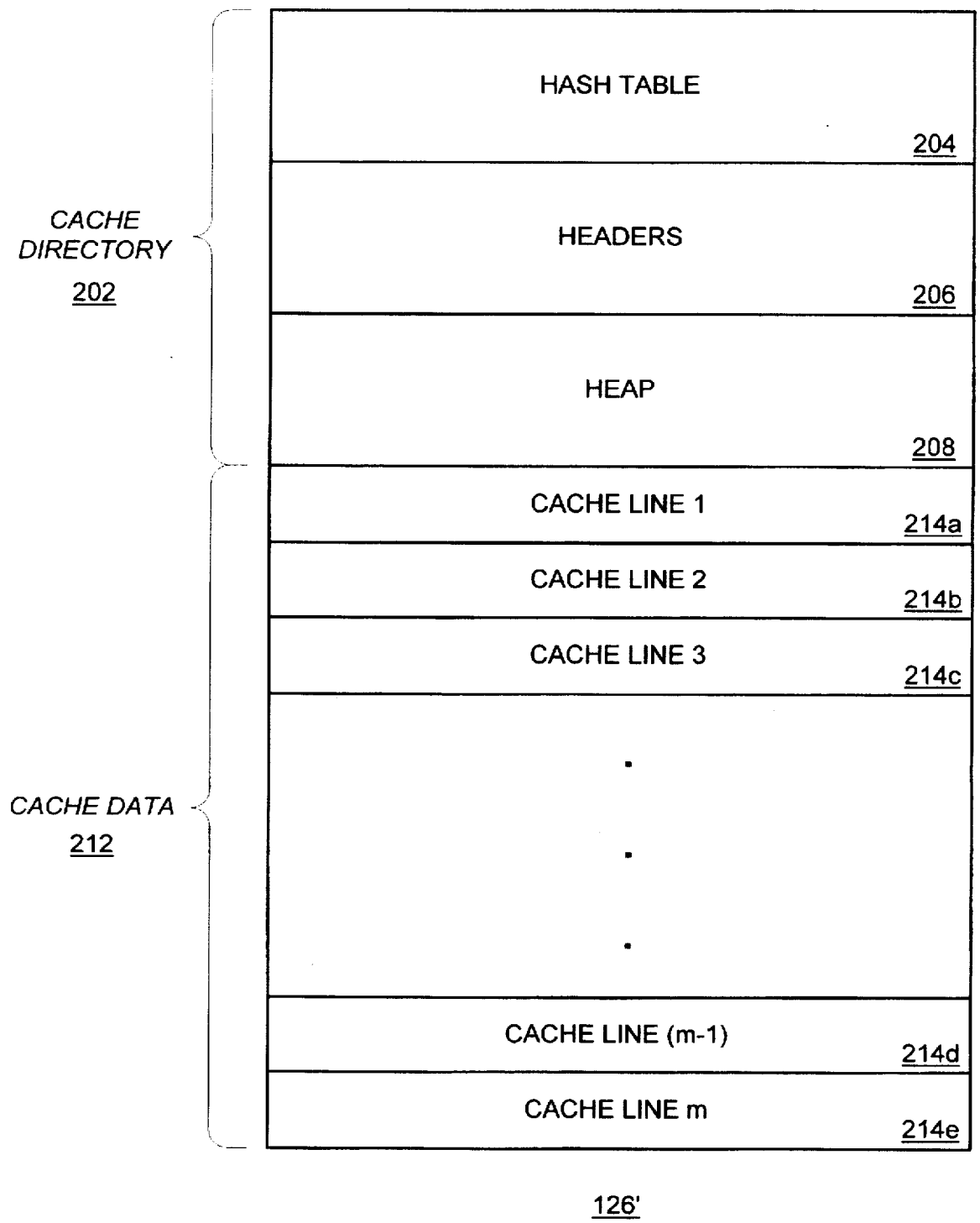
FIG. 2 is a block diagram which illustrates the logical structure of an exemplary cache which may be used in the apparatus of the present invention.

FIG. 2 is a block diagram which illustrates the logical structure of an exemplary cache 126' which may be used in the apparatus of the present invention. Basically, the cache 126' includes a cache directory section 202 and cache data section 212. The cache data section 212 includes cache lines 214, each of which may store one or more blocks of data.

The cache directory section 202 includes information used by the I/O management controller 124 to manage the cache 126' and may include, for example, a hash table 204, headers 206, and a heap 208. As will be discussed below with reference to FIG. 3, the hash table 204, in conjunction with the headers 206, may be used to determine whether a particular block is contained within the cache 126' at a given time. The heap 208, in conjunction with the headers 206, may be used to identify a cache line 214 that is a best candidate for replacement when a cache miss occurs. Since the details of the heap 208 are not particularly relevant of this application, the heap 208 is not described in detail here. However, an example of a heap 208 may be found in U.S. patent application Ser. No. 08/634,886, filed on Apr. 19, 1996, entitled "Method and Apparatus for Computer Disk Management", and assigned to the same assignee as the present application (incorporated herein by reference).

Figure 3:
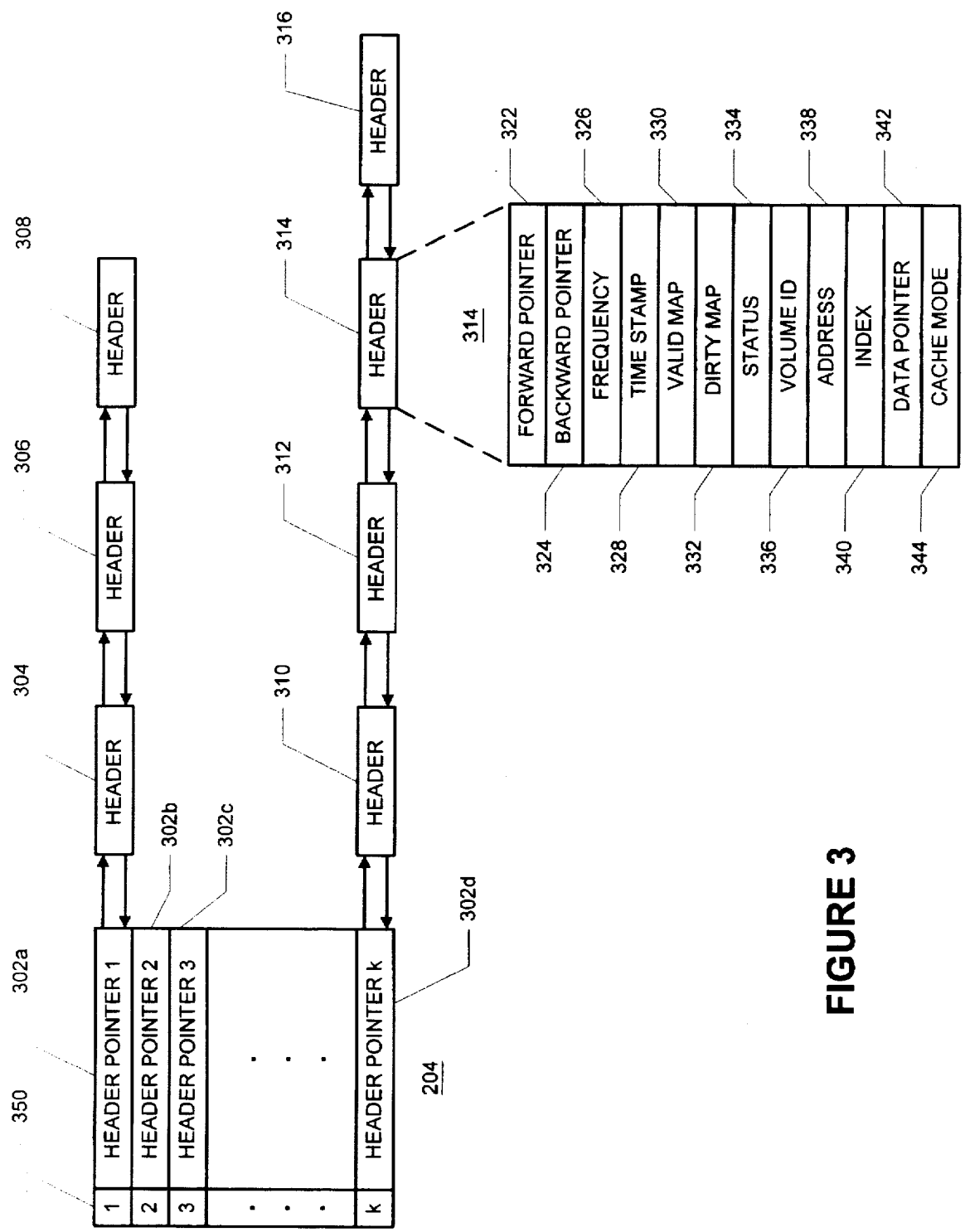
FIG. 3 illustrates the logical structure of the header section of the exemplary cache of FIG. 2.
Figure 4:
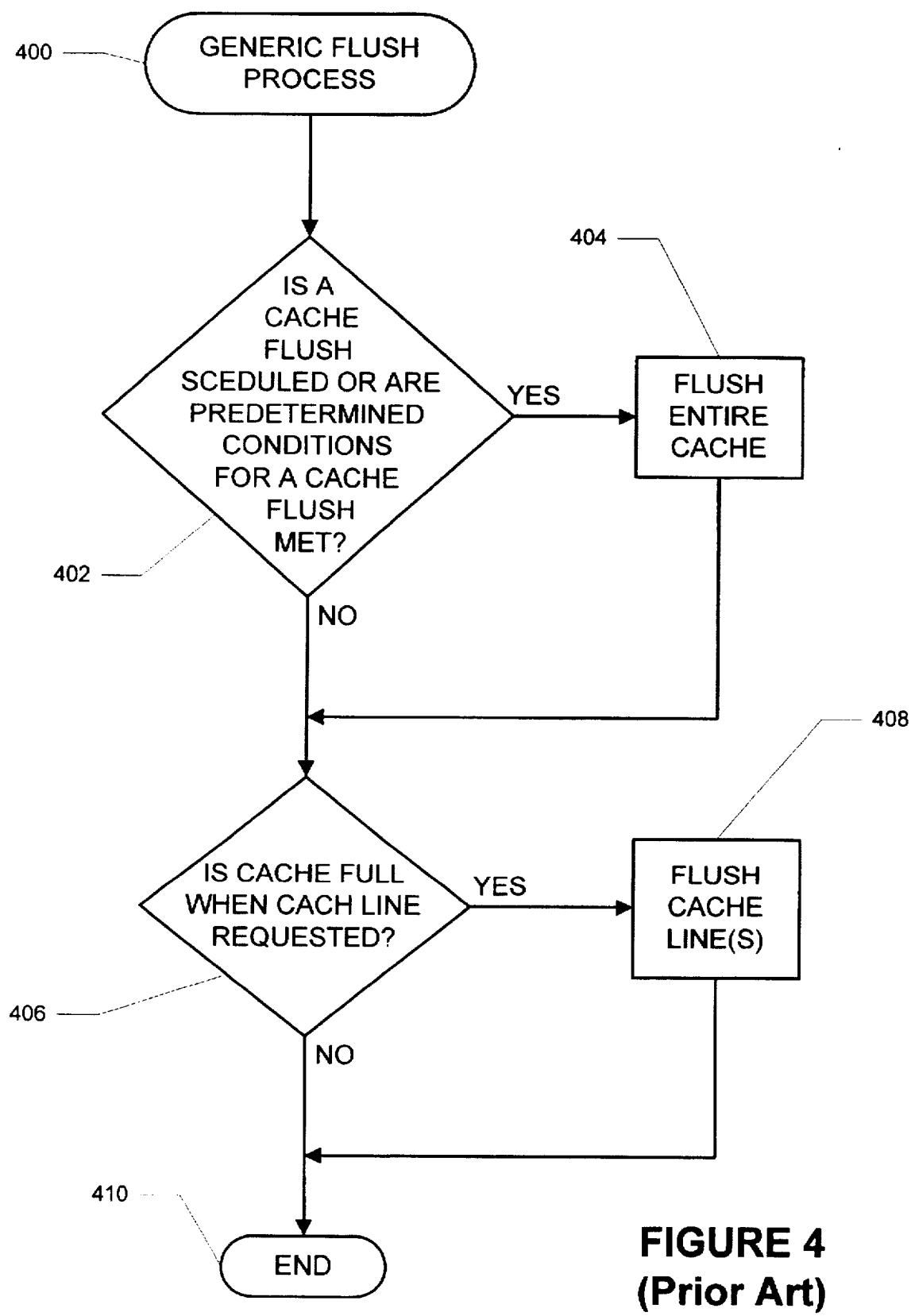
FIG. 4 is a flow diagram which illustrates a generic flush process.

FIG. 3 is a diagram of a hash table 204 and associated chains of linked headers. Basically, the hash table 204 is an array of header pointers 302. An index 350 identifies the position of the header pointers 302 in the hash table 204. Each header pointer 302 points to a corresponding first header in a doubly-linked chain of headers. For example, header pointer 302a points to a first header 304 of a doubly-linked chain of headers including headers 304, 306 and 308. Similarly, header pointer 302d points to a first header 310 of a doubly-linked chain of headers including headers 310, 312, 314, and 316. (Other header chains are not shown for clarity.) The linking of the headers may be used to identify a cache line 214 that is a best candidate for replacement when a cache miss occurs.

Each cache line 214 has an associated header. Each header, as shown by header 314 for example, may include (i) a forward pointer field 322, (ii) a backward pointer field 324, (iii) a frequency field 326, (iv) a time stamp field 328, (v) a valid map field 330, (vi) a dirty map field 332, (vii) a status field 334, (viii) a volume identifier field 336, (ix) an address field 338, (x) an index field 340, (xi) a data pointer field 342, and (xii) a cache mode field 344.

The forward pointer field 322 may include information which provides an address which points to a next header (e.g., header 316) in the chain, while the backward pointer field 324 may include information which provides an address which points to a previous header (e.g., header 312) in the chain. If the header is the first in the chain (e.g., header 310), the information in the backward pointer field 324 will point to a header pointer 302 in the hash table 204. The frequency field 326 may include information which identifies the number of times the particular cache line 214 associated with the header (e.g., via the address, index, and data pointer fields) has been accessed. The time stamp field 328 may include information which identifies a time at which the particular cache line 214 associated with the header was last accessed. The status field 334 may include information which indicates whether a cache line is free. The index field 340 may include information which provides an index into the heap 208 for the cache line. These fields are not particularly relevant to the present invention since they are used, primarily, to determine a cache line that is a best candidate for replacement (e.g., by a replacement algorithm) when a cache miss occurs.

The valid map field 330 may include a bit map in which each bit corresponds to a particular block in the cache line 214 and identifies whether the block contains valid data. More specifically, a cache line has a predefined (e.g., at system initialization) number (e.g., 32, 64, 128, etc.) of fixed length blocks. In some instances, not all of the blocks of a cache line will be filled with valid data. The dirty map field 332 may include a bit map, in which each bit corresponds to a block of data in the cache line 214 and identifies if data has been written to the cache line 214 but not to the storage array. The dirty map is used by flushing methods and apparatus of the present invention as discussed below.

The volume identifier field 336 may include information which identifies the volume (i.e., the logical section of a disk array) to which the cache line 214 belongs. The address field 338 may include information which provides the volume address of the first block of the cache line 214. The data pointer field 342 may include information which identifies the address of the cache line 214 within the cache 126'. Lastly, the cache mode field 344 may include information which identifies a mode (e.g., none, write-through, or write-back) of the cache line 214.

§2.2 Operation of Device

Figure 5:
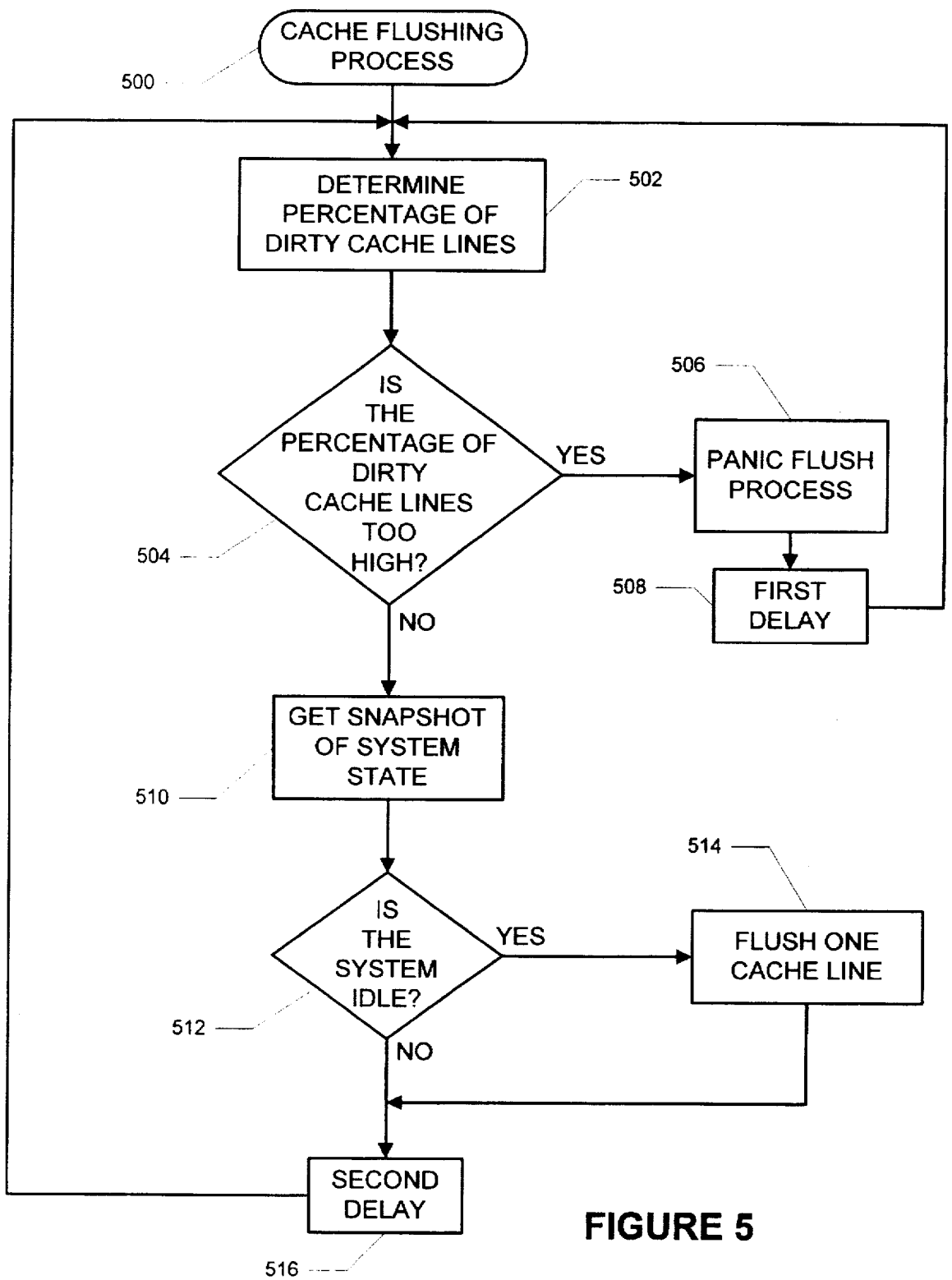
FIG. 5 is a flow diagram which illustrates an exemplary method of the present invention.
Figure 6:
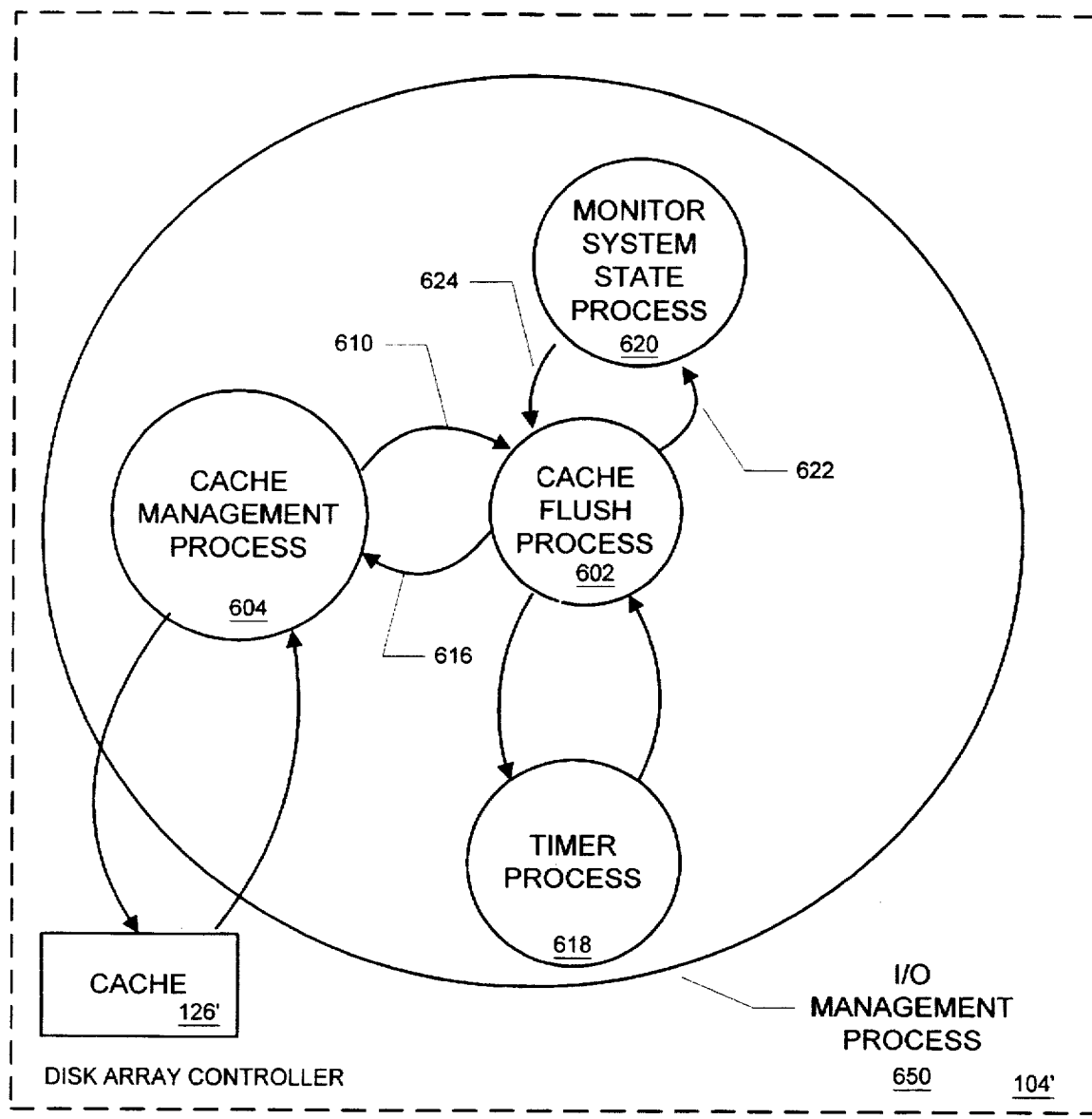
FIG. 6 is an exemplary data flow and process diagram of the present invention.

FIG. 5 is a flow diagram which illustrates an exemplary cache flushing method 500 of the present invention. FIG. 6 is an exemplary data flow and process diagram of the present invention. First, as shown in step 502, the percentage of dirty cache lines is determined. More specifically, as shown in FIG. 6, a cache management process 604, which is a part of an I/O management process 650, determines the percentage of dirty lines of a cache 126' and provides this information, via path 610, to the cache flush process 602. The I/O management process 650, the cache management process 604, the storage controller process 608, the monitor system state process 620 and the cache flush process 602 may be carried out by the processor (not shown) of the I/O management controller 124 in accordance with stored program instructions. Referring to FIGS. 1, 2, and 3, the percentage of dirty lines may be determined by examining the dirty map 332 of each of the headers associated with the cache lines 214 of the cache 126'.

Next, as shown in steps 504, 506, and 508, if the percentage of dirty cache lines is too high (e.g., greater than 95 percent), then the cache is flushed by the cache flush process 602. More specifically, referring again to FIG. 6, the cache flush process 602 requests, via path 616, that the cache management process 604 flush the cache 126'. After a first delay (e.g., 60 seconds), as determined by the timer process 618, the process 500 continues at step 502.

As shown in decision step 504, if the percentage of dirty lines is not too high, the process 500 continues at step 510. As shown in step 510, a snapshot of the system state is retrieved. Referring to FIG. 6, the system state is determined by an independent process 620 which operates over a sampling period during which it gathers system state statistics. A programmable sampling period (e.g., default value of 15 seconds) can be specified by an authorized system user.

At the end of that sampling period it calculates a snapshot of the system state, saves that snapshot for inquiry by other processes and starts over. If a process (e.g., cache flush process 602) requests any of the system state indicators (e.g., via path 622), it receives (e.g., via path 624) those system state indicators that had been gathered over the previous sampling period. System state indicators for a current sampling period are not available until the end of the current sampling period after which they are calculated.

The system state may include, inter alia, (i) dirty line percentage information (discussed above), (ii) CPU idle percentage provided by the operating system of the I/O management controller (e.g., by the monitor system state process 620 via path 624) to the cache flush process 602, and (iii) SCSI busyness percentage provided by the monitor system state process 620, via path 624, to the cache flush process 602. In a preferred embodiment of the present invention, the SCSI busyness percentage is based on the number of blocks transferred during the sampling period, divided by the theoretical maximum number of blocks transferable during the sampling period. In a preferred method, the system is considered idle if (i) the percentage of dirty lines is above a first threshold (e.g., 0), (ii) the CPU idle percentage is above a second threshold (e.g., 50 percent), and (iii) the SCSI busyness percentage is less than a third threshold (e.g., less than or equal to 50 percent).

In an alternative methodology, the system state may be based on CPI idle percentage and I/Os per second. However, this alternative may not perform as well in systems having DMA units and in which the sizes of the I/Os performed are typically large.

As shown in steps 512 and 514, if the system is determined to be idle, the cache flush process 602, via path 616, requests that the cache management process 604 flush one cache line of the cache 126'. The cache management process 604 may use a replacement algorithm to determine the cache line to flush. As shown in step 516, after a second delay (e.g., 30 seconds) as determined by timer process 618, the process 500/602 repeats.

What is claimed is:

1. A method for managing a cache which includes a number of dirty lines, the method including steps of:
    a) determining whether a state of a system is idle based on at least two indicators including (i) CPU idle percentage, (ii) data bus busyness percentage, (iii) percentage of dirty lines, and (iv) I/Os per second; and
    b) flushing, if the state of the system is determined to be idle, a line of the cache.

2. The method of claim 1 wherein the state of the system is determined to be idle when (i) the CPU idle percentage is above a first predetermined threshold, and (ii) the data bus busyness percentage is below a second threshold.

3. The method of claim 2 wherein the first predetermined threshold is 50 percent.

4. The method of claim 2 wherein the second predetermined threshold is 50 percent.

5. The method of claim 2 wherein both the first and second predetermined thresholds are 50 percent.

6. The method of claim 2 wherein data bus busyness percentage is determined by dividing the number of blocks transferred over a data bus during a sampling period divided by the theoretical maximum number of blocks transferable over the data bus during the sampling period.

7. The method of claim 6 wherein the data bus is a SCSI bus.

8. In a system having a host computer and a mass storage device, a mass storage controller comprising:
    a) an input/output interface for permitting communication between the host computer, the mass storage controller, and the mass storage device;
    b) a cache having a number of cache lines, some of which cache lines may include dirty data; and
    c) an input/output management controller, the input output management controller including
        i) means for determining whether a state of a system is idle based on at least two indicators including (i) a host CPU idle percentage, (ii) data bus busyness percentage, (iii) percentage of dirty lines, and (iv) I/Os per second; and
        ii) means for flushing a line of the cache if the state of the system is determined to be idle.

9. The device of claim 8 wherein the state of the system is determined to be idle when (i) the CPU idle percentage is above a first predetermined threshold, and (ii) the data bus busyness percentage is below a second threshold.

10. The device of claim 9 wherein data bus busyness percentage is determined by dividing the number of blocks transferred over a data bus during a sampling period divided by the theoretical maximum number of blocks transferable over the data bus during the sampling period.

11. The method of claim 10 wherein the data bus is a SCSI bus.

12. A method for managing a cache which includes a number of dirty lines, the method including steps of:
    a) determining the percentage of dirty lines in the cache;
    b) flushing, if the determined percentage of dirty lines exceeds a predetermined threshold, the cache;
    c) determining whether a state of a system is idle based on at least two indicators including (i) CPU idle percentage, (ii) data bus busyness percentage, (iii) percentage of dirty lines, and (iv) I/Os per second; and
    d) flushing, if the state of the system is determined to be idle, a line of the cache.

13. The method of claim 12 wherein the predetermined threshold is 95 percent.

14. The method of claim 12 wherein the cache includes a total number of cache lines, and
    wherein the step of determining the percentage of dirty lines in the cache includes sub-steps of
    i) determining a number of dirty cache lines based on cache lines having headers with a dirty map indicating dirty data,
    ii) dividing the number of dirty cache lines, determined above, by the total number of cache lines of the cache to derive a intermediate result, and
    iii) multiplying the intermediate result by 100.

15. The method of claim 12 wherein the state of the system is determined to be idle when (i) the CPU idle percentage is above a first predetermined threshold, and (ii) the data bus busyness percentage is below a second threshold.

16. The method of claim 15 wherein the first predetermined threshold is 50 percent.

17. The method of claim 15 wherein the second predetermined threshold is 50 percent.

18. The method of claim 15 wherein both the first and second predetermined thresholds are 50 percent.

19. The method of claim 15 wherein data bus busyness percentage is determined by dividing the number of blocks transferred over a data bus during a sampling period divided by the theoretical maximum number of blocks transferable over the data bus during the sampling period.

* * * * *